United States Patent
Huang

[11] Patent Number: 5,876,057
[45] Date of Patent: Mar. 2, 1999

[54] FOLDING DEVICE FOR A STROLLER

[75] Inventor: Li-Chu Chen Huang, Chiayi, Taiwan

[73] Assignee: Discovery International Co., Ltd., Tortola, Virgin Islands (Br.)

[21] Appl. No.: 4,305

[22] Filed: Jan. 8, 1998

[51] Int. Cl.[6] .................................................. B62B 7/06
[52] U.S. Cl. .......................... 280/642; 280/655; 280/658
[58] Field of Search .................................... 280/650, 638, 280/641, 642, 644, 647, 655, 655.1, 657, 658, 47.36, 47.38, 47.41

[56] References Cited

U.S. PATENT DOCUMENTS

| | | | |
|---|---|---|---|
| 5,460,398 | 10/1995 | Huang | 280/642 |
| 5,482,311 | 1/1996 | Huang | 280/642 |
| 5,725,238 | 3/1998 | Huang | 280/642 |

*Primary Examiner*—Richard M. Camby
*Attorney, Agent, or Firm*—Bacon & Thomas, PLLC

[57] ABSTRACT

A device for a stroller having a driving member, a driven member and a recovery member is able to control folding and unfolding processes of the stroller easily.

2 Claims, 7 Drawing Sheets

FOLDING DEVICE FOR A STROLLER

BACKGROUND OF THE INVENTION

1. Field of the Invention

The present invention relates to a device for readily folding a stroller, and more particularly to a device which allows the stroller to be securely expanded and further to be folded easily.

2. Description of Related Art

Various strollers have been provided all over the world for years. Many types of safety equipment have also been invented for attachment to the strollers to increase the safety of the strollers and to make the strollers become more handy for all users. To be handy, the stroller should be able to provide the user a fixed and strong structure when used, and an easily operated procedure for folding frames of the stroller. However, most of the currently used foldable strollers simply use hooks and lugs respectively located on front supports and rear supports of the stroller to achieve assembly and disassembly thereof. By using the attachable engagement between the hooks and the corresponding lugs, a user is able to expand the stroller to a firm structure for a baby to be seated therein, and also to fold the stroller to a minimized volume. However, disconnecting the hooks and the lugs often causes users a lot of trouble and sometimes confusion about which hook he/she should be using to fold/unfold the stroller.

The present invention provides an improved device for easily operating the folding/unfolding of stroller for a user to mitigate and/or obviate the aforementioned problems.

SUMMARY OF THE INVENTION

One object of the present invention is to provide a device which allows a stroller to be folded and unfolded easily and accurately.

Other objects, advantages and novel features of the invention will become more apparent from the following detailed description when taken in conjunction with the accompanying drawings.

DETAILED DESCRIPTION OF PREFERRED EMBODIMENT

Figure 1:
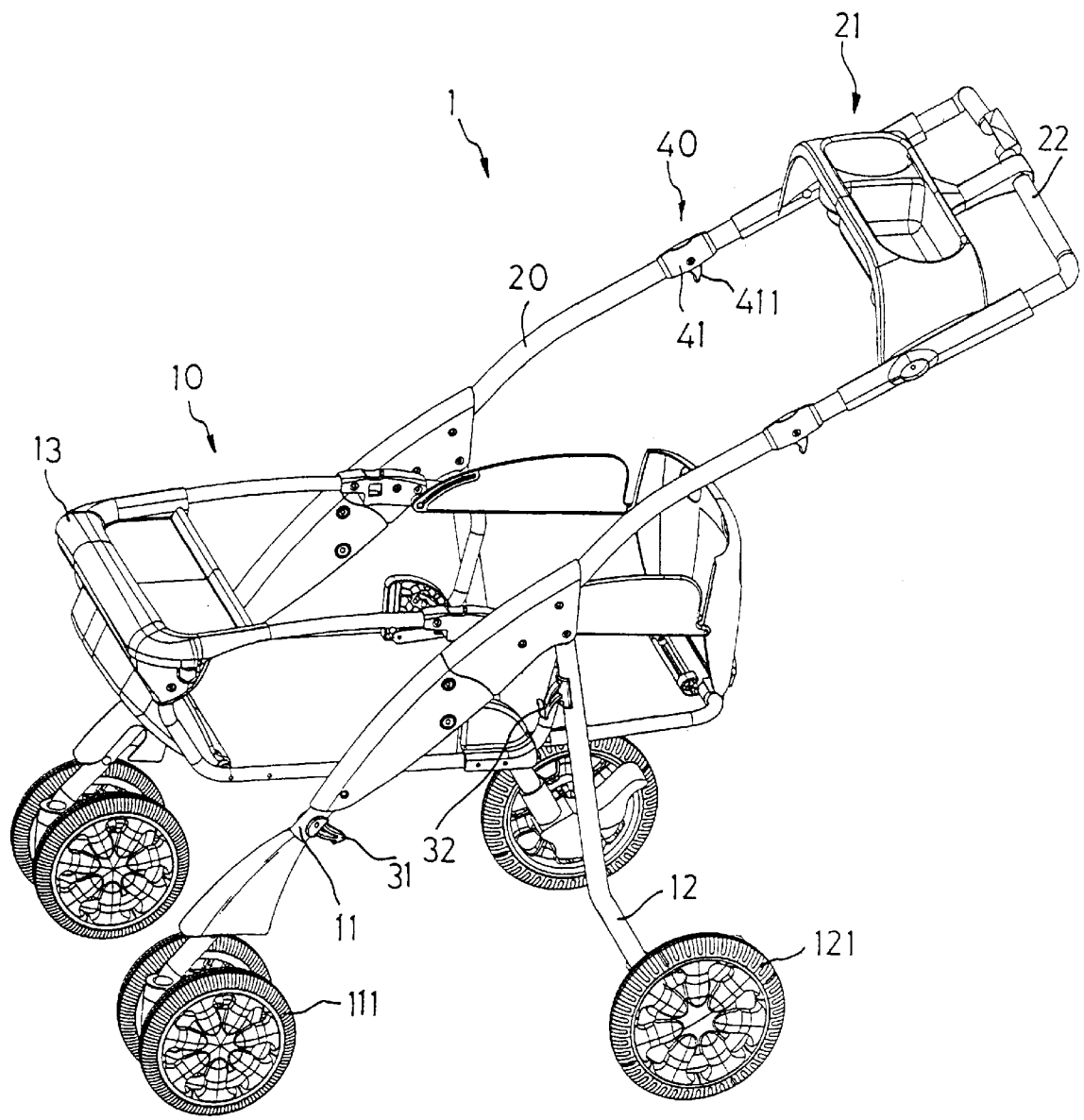
FIG. 1 is a perspective view showing a device for folding/unfolding a stroller and constructed in accordance with the present invention is mounted between an upper support and a lower support.
Figure 2:
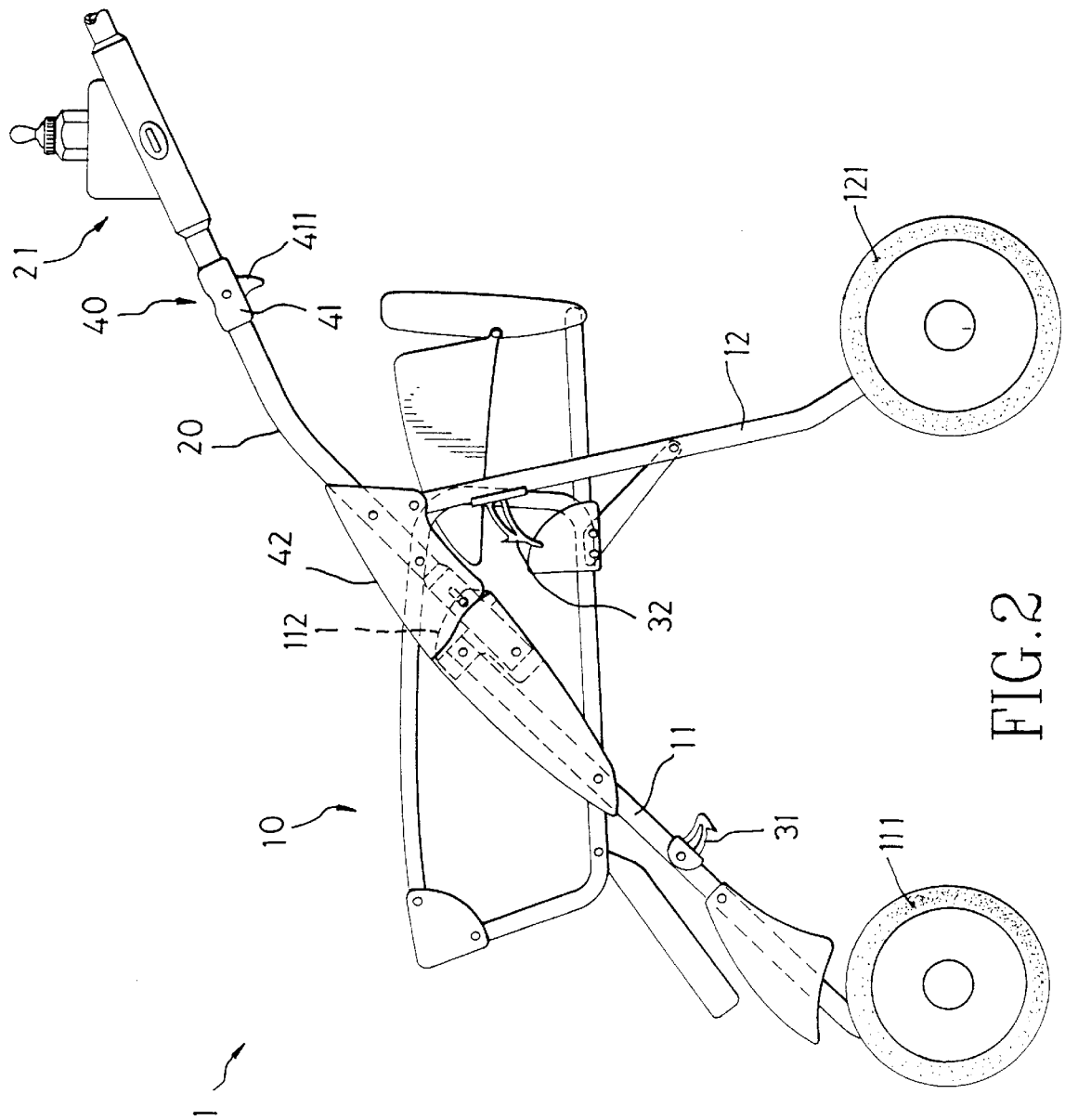
FIG. 2 is a side view of the stroller.
Figure 6:
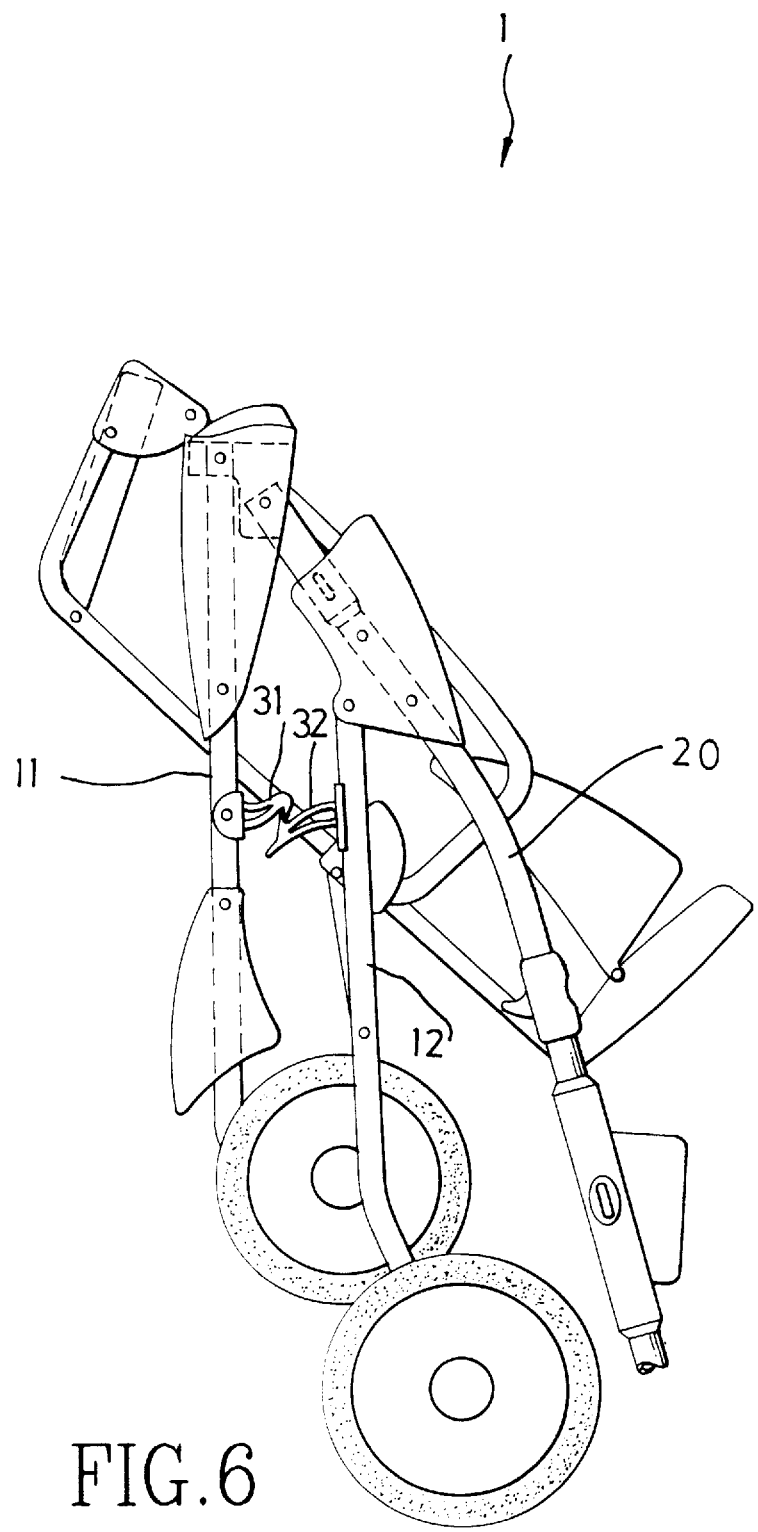
FIG. 6 is a side view showing a folded stroller having the device of the invention mounted thereon.

Referring to FIG. 1 and FIG. 2, a stroller 1 has an upper support 20 and a set of lower supports 10 pivotally connected with the upper support 20 and having a pair of symmetrically opposed front supports 11, a pair of symmetrically opposed rear supports 12 each pivotally connected with each of the pair of the front supports 11 and a seat 13 pivotally and respectively connected with the upper support 20, the front supports 11 and the rear supports 12. Since each of the pair of the front supports 11 and each of the pair of the rear supports 12 are respectively connected in the same manner, only one side of the stroller 1 concerning the relationship between the front support 11 and the rear support 12 is described hereinafter. A distal end of the front support 11 and A first distal end of the rear support 12 is pivotally connected with a wheeled member 111, 121 respectively, such that when the stroller 1 is unfolded as shown in FIG. 1, a user is able to wheel the stroller 1 around. Furthermore, it is to be noted that a case 21 is mounted onto a top portion of the upper support 20, so that the user is able to place object (as seen in FIG. 2), such as a milk bottle, tissue paper, therein to make the stroller 1 handy. A hook member (not numbered) having a first hook 31 mounted onto a portion of the front support 11 and a second hook 32 mounted onto a portion of the rear support 12, whereby the first hook 31 and the second hook 32 can engage with each other to retain the stroller 1 in a folded position when desired, as shown in FIG. 6.

Figure 3:
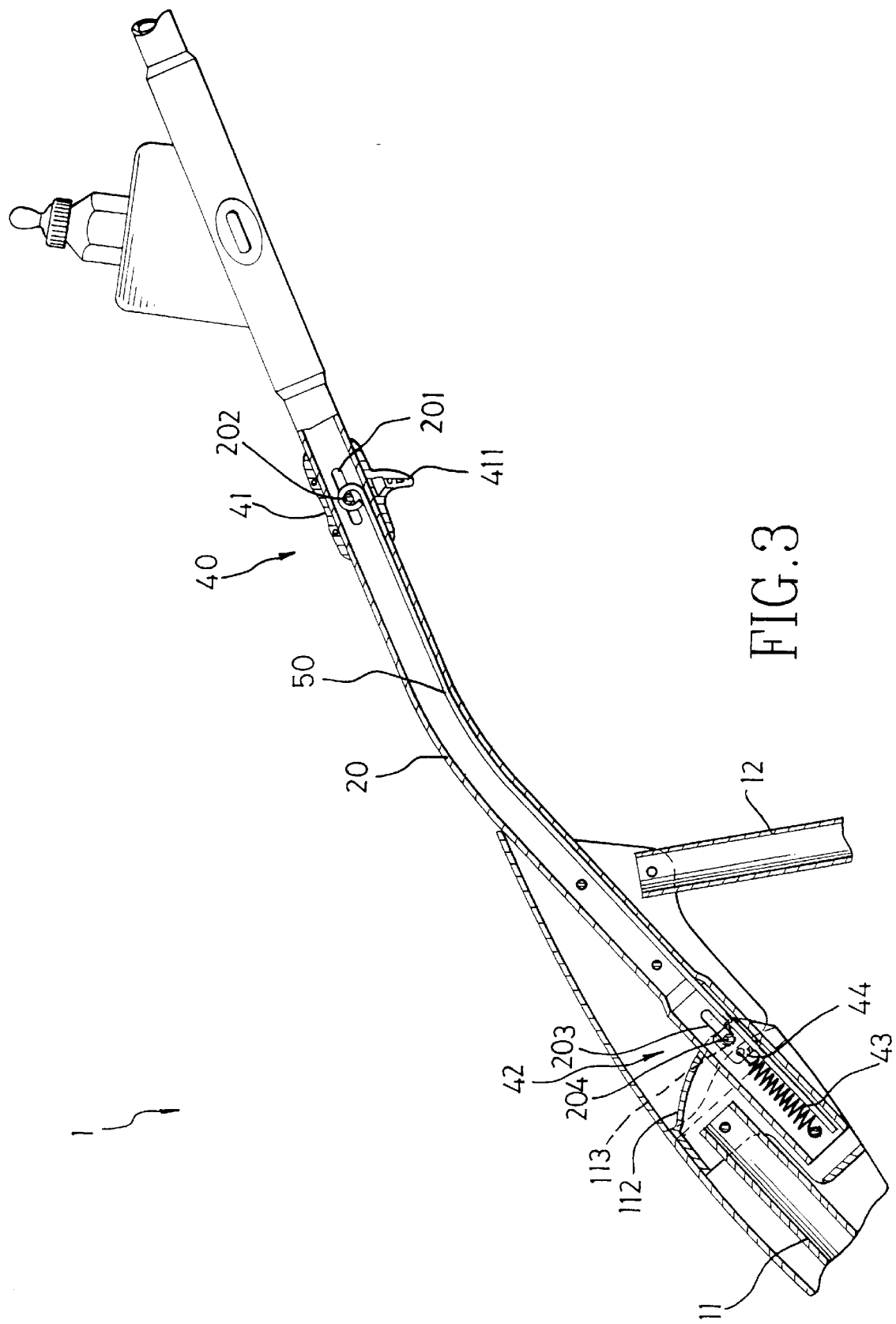
FIG. 3 is a cross sectional view showing an inner structure of the device shown in FIG. 1.

Still referring to FIGS. 1, 2 and further to FIG. 3, the stroller 1 further has a device 40 controlling folding and unfolding operations of the stroller 1. The device 40 comprises a driving member 41 movably mounted around a top portion of the upper support 20 and having a protrusion 411 extending out therefrom, a driven member 42 and a recovery member 43, such as a coil spring, mounted onto a distal end of the upper support 20. It is to be noted that a slot 201 is defined in a periphery of the upper support 20 for movably receiving a post 202 therein. Since the post 202 and the driving member 41 are securely connected together, pushing the driving member 41 back and forth will also activate a corresponding movement of the post 202 within the slot 201 of the upper support 20. A first distal end of a strip 50 which extends within the upper support 20 is securely connected to the post 202 and a second distal end thereof is securely connected to a sliding plate 44 slidably received within the upper support 20. A first end of the recovery member 43 is securely mounted on a distal end of the upper support 20 and a second end thereof is securely connected to the sliding plate 44, thereby allowing a reciprocating movement of the sliding plate 44 due to the provision of the recovery member 43. Furthermore, a second slot 203 is defined in a periphery of the upper support 20 and a second post 204 securely connected with the sliding plate 44 is slidably received therein. By this arrangement, when a user pulls the protrusion 411 of the driving member 41, the first post 202 and the second post 204 will be pulled in the same direction as the protrusion 411 moves.

Figure 4:
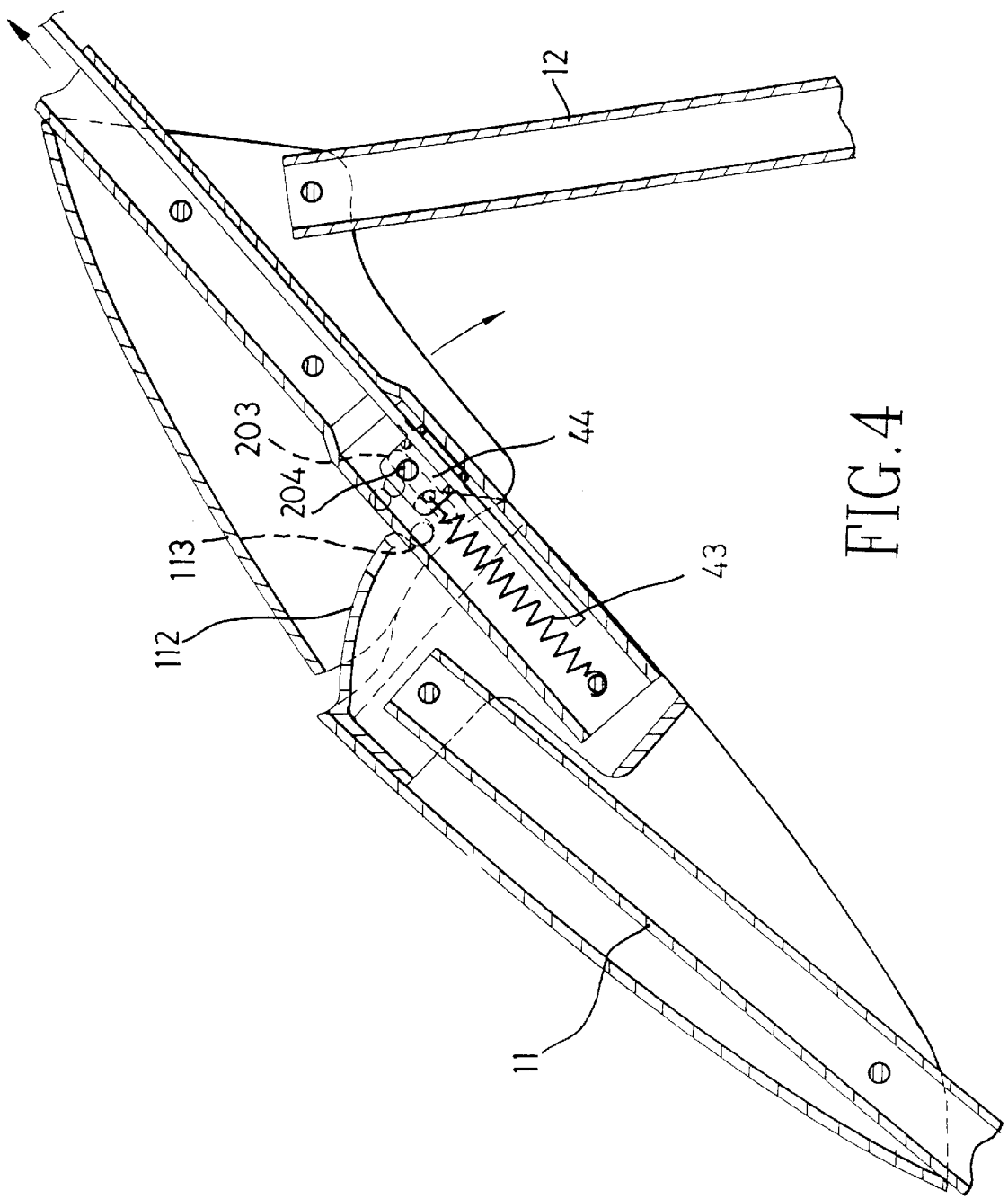
FIGS. 4 and 5 are cross sectional views showing a corresponding movement of the upper support and the lower supports.
Figure 5:
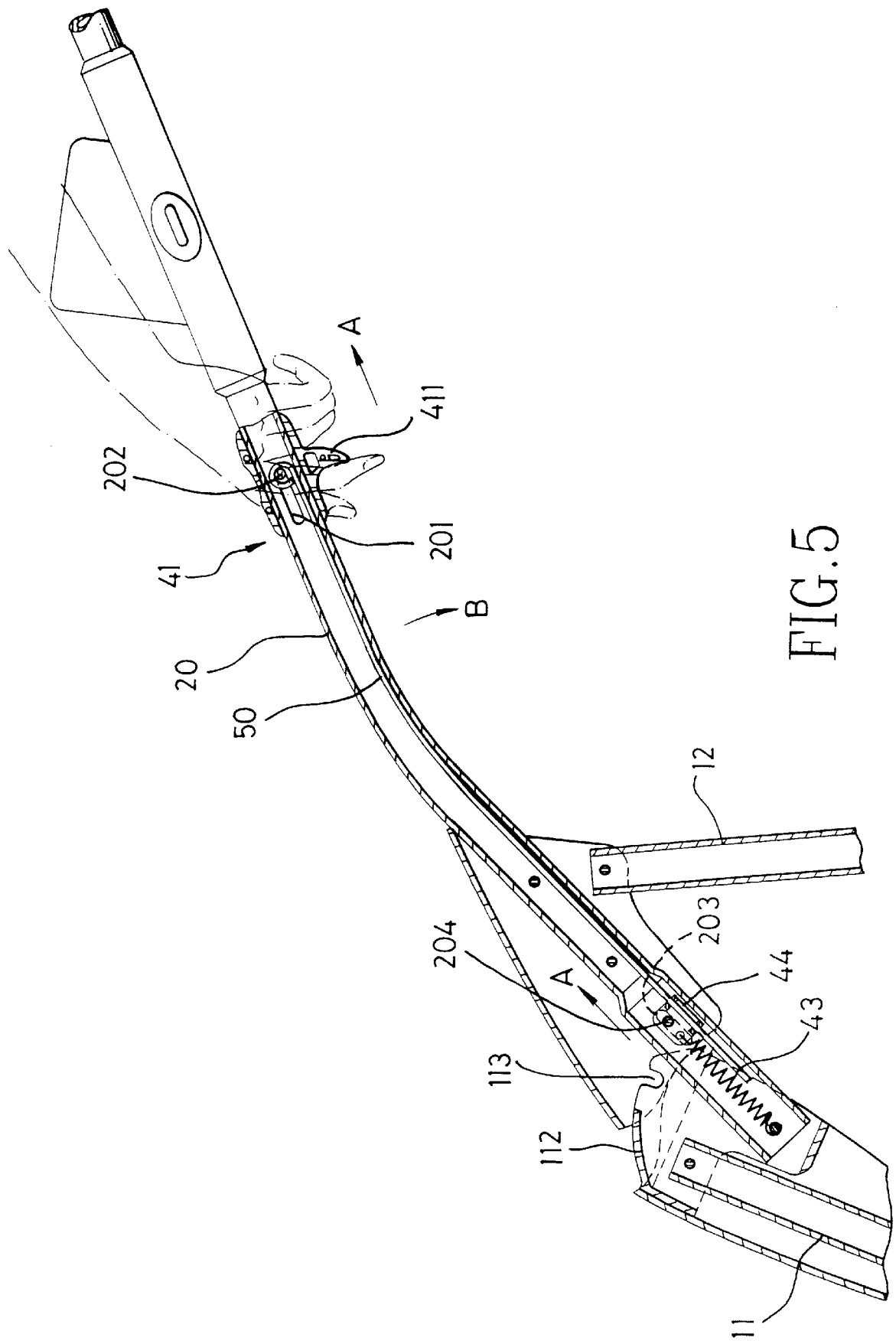

A recess 113 is defined in a cover 112 which encloses a top end of the front support 11 and has the second post 204 detachably received therein. Therefore, referring to FIGS. 4 and 5, when the protrusion 411 of the driving member 41 is pulled in a direction as shown by arrow A, due to the strip 50 being securely connected between the first post 202 slidably received within the first slot 201 and the sliding plate 44, the second post 204 slidably received within the second slot 203 will also be pulled in the same direction, accordingly the second post 204 will leave the recess 113 and the upper support 20 is able to be separated from the front support 11 by pressing the upper support 20 downward in a direction as shown by arrow B. Further, since the recovery member 43 is securely mounted between the distal end of the upper support 20 and the sliding plate 44, after the force applied by the user to the protrusion 411 is released, the sliding plate 44 returns to its original position due to the recovery force provided by the recovery member 43.

Figure 7:
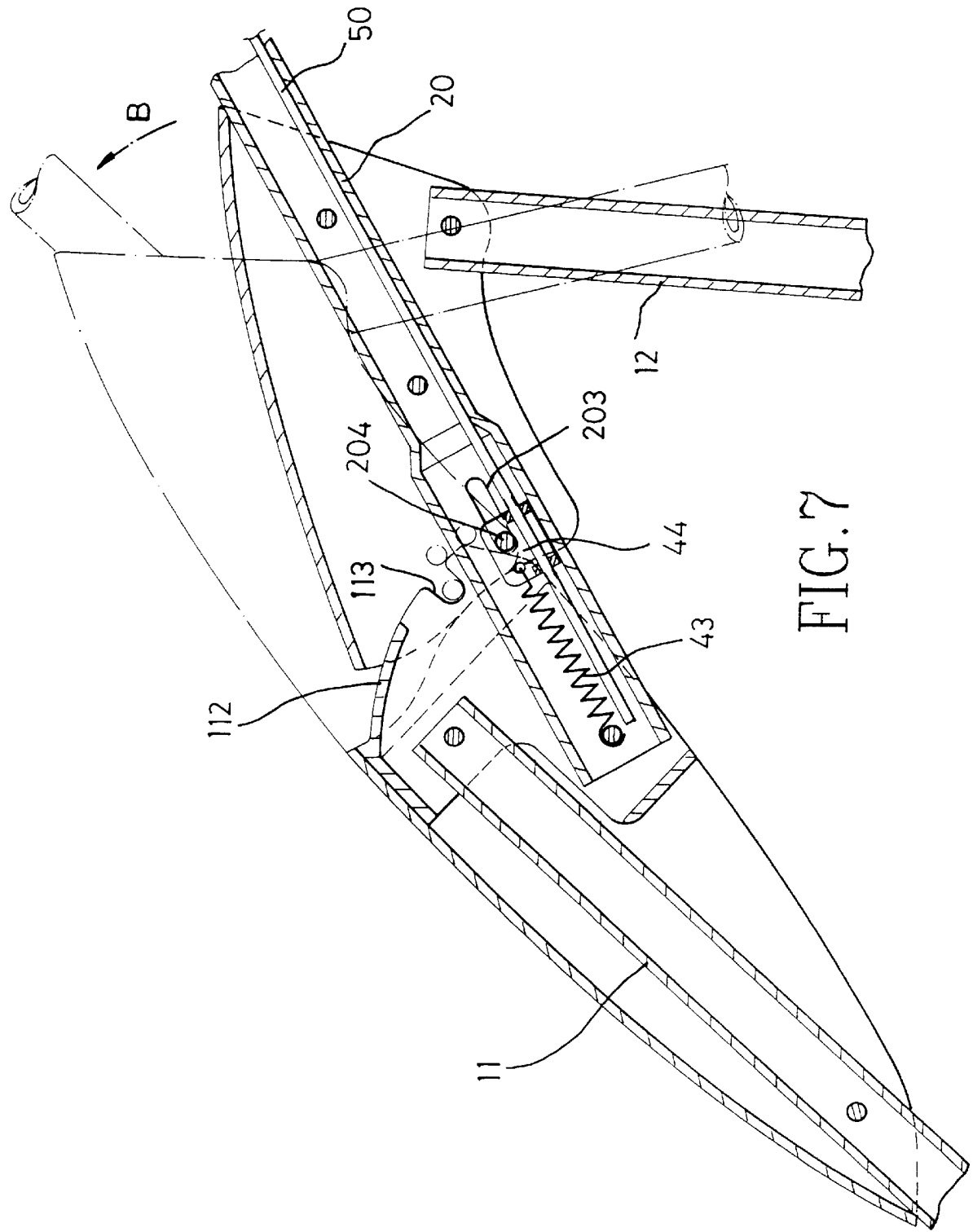
FIG. 7 is a schematic view showing a relationship between the upper support and the lower supports when the device of the invention is to be unfolded.

Referring to FIG. 7, when the stroller 1 having the folding device 40 constructed in accordance with the present invention is about to be unfolded, the user only needs to move the upper support 20 to a direction as shown by an arrow B, whereafter the second post 204 will be easily and slidably received within the recess 113 because the recess 113 has a rounded contour.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A folding device for a stroller comprising:

a driving member movably mounted around a top portion of an upper support of the stroller and having a protrusion extending out therefrom, a first post movably received within a first slot defined in a periphery of the upper support and securely connected with said driving member, and a strip extending within the upper support and having a first distal end securely connected with said first post;

a driven member having a second post movably received within a second slot defined in a periphery of the upper support and a sliding plate slidably received within the upper support and securely connected with said second post and a second distal end of said strip;

a recovery member having a first end securely mounted to a distal end of the upper support and a second end of which is securely connected with said sliding plate; and a cover enclosing a top end of a front support of the stroller and having a recess defined therein; said recess being defined to detachably receive said second post therein.

2. The device as claimed in claim 1, wherein a periphery around said recess is rounded.

* * * * *